Patented Dec. 14, 1948

2,456,545

UNITED STATES PATENT OFFICE 2,456,545

SYNTHESIS OF CHLORAL

Thomas H. Vaughn, Grosse Ile, Mich., assignor to Wyandotte Chemicals Corporation, Wyandotte, Mich., a corporation of Michigan No Drawing. Application November 26, 1945, Serial No. 630,995

7 Claims. (Cl. 260—601)

This invention relates to a novel process for making trichloroacetaldehyde which is more commonly known as chloral. Chloral, in combination with water, forms the valuable hynoptic, chloral hydrate. Chloral is one of the raw materials used in the manufacture of diparachlorodiphenyltrichloroethane, an excellent insecticide. Heretofore, chloral has been made by a process known for over one hundred years and involving the chlorination of absolute ethyl alcohol to form chloral alcoholate followed by hydrolysis with sulfuric acid. See Liebig's Annalen, vol. 1, page 189 (1932). More recently, a process for making chloral has been disclosed (see U. S. Patent No. 2,042,303) involving the reaction of carbon tetrachloride and formaldehyde at relatively high temperatures of 200–500° C. and under the high pressure of 20–200 atmospheres.

I have discovered that chloral may be synthesized by a relatively simple and economically feasible process involving the chlorination of ethylene chlorohydrin ($\beta$ chloroethyl alcohol). My process is illustrated by the following chemical equation:

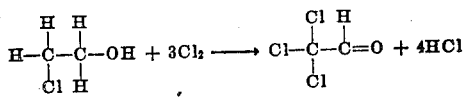

Ethylene Chlorohydrin+Chlorine → Chloral+Acid Hydrochloric

Briefly outlined, my process involves the diffusion of chlorine gas through a body of ethylene chlorohydrin, either in the anhydrous state or as as equeous solution, for a period approximately 72 hours and accompanied by a gradual increase in the reaction temperature, up to a temperature of 90° C. The chlorination may be conducted at atmospheric pressure and the reaction mixture subjected to a fractional distillation whereupon the chloral is removed from the unreacted ethylene chlorohydrin, and from the higher boiling reaction products.

Preferably an aqueous solution of ethylene chlorohydrin and most suitably the azeotropic mixture of 44% ethylene chlorohydrin and water, is employed as the starting material in my process. However, relatively dilute ethylene chlorohydrin solutions may be employed, viz. those on the order of 10% ethylene chlorohydrin concentration. Anhydrous, or 100% ethylene chlorohydrin can also be used as the starting material. In the latter case, a chlorination catalyst, such as iodine, aids in the reaction. A substantial conversion to chloral of the ethylene chlorohydrin treated is thus made possible by my process. Unreacted ethylene chlorohydrin, on being separated from the reaction mixture by fractional distillation is, of course, available for recycling and "make up" of additional starting material in my process.

The following examples will serve to explain my invention in greater detail to those skilled in the art so that they may readily understand and practice same. These examples, however, are given by way of illustration and not limitation, the precise scope and nature of my invention being set forth in the appended claims.

Example 1

Anhydrous ethylene chlorohydrin in the amount of 700 grams was chlorinated over a period of seventy-two hours in a flask equipped with a fritted glass chlorine disperser, an efficient stirrer, a thermometer and a reflux condenser. During the first twenty-four hours the temperature was maintained between 12° and 20° C.; during the second twenty-four hours between 80° and 90° C. The reaction product was distilled through a 12 mm. x 90 cm. column packed with ⅛" helices. A fraction was obtained boiling between 92 and 98° C. which was identified as chloral and amounted to 30.7% of the amount of ethylene chlorohydrin reacted. Unreacted ethylene chlorohydrin and a fraction boiling between 190 and 200° C. was recovered by distillation. A partial characterization of the high boiling fraction indicated that it is a mixture of mono-, di-, and trichloro acetic acids.

Example 2

Anhydrous ethylene chlorohydrin in the amount of 800 grams was chlorinated over a period of seventy-two hours in an apparatus similar to that used in Example 1. For the first twenty-four hours the temperature was maintained between 40° and 50° C. and during the final forty-eight hours between 80° and 90° C. Upon distillation through the same column used in Example 1 a fraction boiling between 93° and 98° C. was obtained. This was identified as chloral and amounted in yield to 23.9% of the amount of ethylene chlorohydrin reacted. Unreacted ethylene chlorohydrin and a fraction boiling between 190° and 200° C. was recovered. This high boiling fraction was of the same character of the corresponding fraction obtained in Example 1.

Example 3

The azeotropic mixture of ethylene chlorohydrin and water in the amount of 1200 grams and containing 44% ethylene chlorohydrin, was chlorinated over a period of seventy-two hours in an apparatus similar to that used in Examples 1 and 2. During the first twenty-four hours the temperature was held between 20° and 40° C., and during the final forty-eight hours at 80–90° C. The reaction products were distilled through the same column as was used in Examples 1 and 2. A fraction boiling between 93° and 98° C. was obtained. This was identified as chloral hydrate and amounted to 61.4% of the amount of ethylene chlorohydrin reacted. A second fraction was obtained boiling between 102 and 108° C. which consisted of unreacted ethylene chlorohydrin, water, and HCl. Although this distillate range is very close to that of the chloral fraction, the separation can be carried out effectively probably because of the azeotropic nature of these fractions. The high boiling fraction was not isolated.

*Example 4*

Anhydrous ethylene chlorohydrin in the amount of 1200 grams was chlorinated over a period of seventy-two hours using a small amount of iodine as a catalyst. The reaction was carried out in an apparatus similar to that used in Example 1. During the first twenty-four hours the temperature was held between 40° and 50° C. and for the final forty-eight hours between 80° and 90° C. The reaction products were distilled through the column used in Example 1. A fraction boiling between 93 and 98° C., identified as chloral, was obtained and amounted to 48.1% of the amount of ethylene chlorohydrin reacted. Unreacted ethylene chlorohydrin and a fraction boiling between 190 and 200° C. were recovered. The high boiling fraction was similar to that obtained in Examples 1 and 2.

*Example 5*

A 10% solution of ethylene chlorohydrin in water in the amount of 1200 grams was chlorinated over a period of seventy-two hours in a tower having a liquid depth of four feet and equipped with an electrical heating jacket, an outside return tube from top to bottom, to provide for thermal circulation, a reflux condenser, chlorine disperser and a thermometer. During the first twenty-four hours the temperature was held between 65–70° C. and for the final forty-eight hours between 80 and 90° C. The reaction products were fractionated through the column used in Example 1 and a fraction boiling between 93 and 98° C. collected. This was found to be chloral hydrate and amounted to a yield of 29.6% based on the amount of ethylene chlorohydrin reacting. A fraction boiling between 102 and 108° C., containing unreacted ethylene chlorohydrin water, and HCl was obtained.

Other modes of applying the principle of my invention may be employed, changes being made as regards to the details described, provided the features stated in any of the following claims or the equivalent of such be employed.

I, therefore, particularly point out and distinctly claim as my invention:

1. The method of making chloral which comprises chlorinating ethylene chlorohydrin at a temperature not over 90° C.

2. The method of making chloral which comprises chlorinating ethylene chlorohydrin for a period of time of the order of 72 hours and at a temperature not over 90° C., and then distilling off chloral from the reaction mixture.

3. The method of making chloral which comprises chlorinating an aqueous solution of ethylene chlorohydrin at a temperature not over 90° C.

4. The method of making chloral which comprises chlorinating an azeotropic mixture consisting of 44% ethylene chlorohydrin and water at a temperature not over 90° C.

5. The method of making chloral which comprises chlorinating anhydrous ethylene chlorohydrin in the presence of a chlorination catalyst at a temperature not over 90° C.

6. The method of making chloral which comprises chlorinating anhydrous ethylene chlorohydrin in the presence of iodine at a temperature not over 90° C.

7. The method of converting ethylene chlorohydrin to chloral and chloracetic acids having one or more substituent chlorine atoms, which comprises chlorinating ethylene chlorohydrin for a period of time of the order of 72 hours and at a temperature not over 90° C., and then separating the chloral and chloracetic acid products by fractional distillation.

THOMAS H. VAUGHN.

REFERENCES CITED

The following references are of record in the file of this patent:

UNITED STATES PATENTS

| Number | Name | Date |
| --- | --- | --- |
| 774,151 | Besson | Nov. 8, 1904 |
| 2,188,254 | Smithuysen | Jan. 23, 1940 |

OTHER REFERENCES

Riegel, "Industrial Chemistry," first edition (1928) pages 330–331.